US008934917B1

(12) United States Patent
Pal et al.

(10) Patent No.: US 8,934,917 B1
(45) Date of Patent: Jan. 13, 2015

(54) OPPORTUNISTIC DATA CONNECTIVITY

(71) Applicant: General Motors LLC, Detroit, MI (US)

(72) Inventors: Dipankar Pal, Sylvania, OH (US); Andrew J. Macdonald, Grosse Pointe Park, MI (US); John L. Dale, Fenton, MI (US)

(73) Assignee: General Motors LLC, Detroit, MI (US)

( * ) Notice: Subject to any disclaimer, the term of this patent is extended or adjusted under 35 U.S.C. 154(b) by 23 days.

(21) Appl. No.: 13/938,673

(22) Filed: Jul. 10, 2013

(51) Int. Cl.
H04W 72/00 (2009.01)
H04W 72/04 (2009.01)

(52) U.S. Cl.
CPC .................. H04W 72/04 (2013.01)
USPC .................................. 455/450

(58) Field of Classification Search
USPC .................................. 455/450
See application file for complete search history.

(56) References Cited

U.S. PATENT DOCUMENTS

2009/0117947 A1* 5/2009 Birmingham .............. 455/569.2

* cited by examiner

Primary Examiner — Joel Ajayi
(74) Attorney, Agent, or Firm — Anthony Luke Simon; Reising Ethington P.C.

(57) ABSTRACT

A method of controlling a vehicle telematics unit includes placing the vehicle telematics unit in a data mode while camped on a base station that does not use a simultaneous voice and data (SVD) cellular standard; sensing an amount of time that has passed since the vehicle telematics unit last received a request for data while in the data mode; comparing the sensed amount of time with a predetermined threshold using the vehicle telematics unit; and commanding the vehicle telematics unit to maintain the data mode and also to enter a voice mode when the sensed amount of time exceeds the predetermined threshold.

16 Claims, 2 Drawing Sheets

OPPORTUNISTIC DATA CONNECTIVITY

TECHNICAL FIELD

The present invention relates to wireless communications involving a vehicle and more specifically to sending voice and data over wireless communications using the vehicle.

BACKGROUND

Many vehicles presently carry a vehicle telematics unit that can be used for communication with third-parties located away from the vehicle. To carry out these communications, the vehicle telematics units use a wireless communication system to send and receive both voice and data communications to/from the vehicle. The communication protocols used to send/receive the voice and data can differ depending on the vehicle telematics unit and/or the wireless communication system. For instance, some vehicle telematics units and/or the wireless communication systems may communicate using a 3G cellular standard, while other units/systems may support a 4G or LTE cellular standard. And depending on which cellular standard is used, it can affect the ability of a vehicle to receive voice or data communications. That is, depending on the cellular standard used by the vehicle telematics unit, it may be able to communicate data but not simultaneously receive voice communications.

SUMMARY

According to an embodiment of the invention, there is provided a method of controlling a vehicle telematics unit. The method includes placing the vehicle telematics unit in a data mode while camped on a base station that does not use a simultaneous voice and data (SVD) cellular standard; sensing an amount of time that has passed since the vehicle telematics unit last received a request for data while in the data mode; comparing the sensed amount of time with a predetermined threshold using the vehicle telematics unit; and commanding the vehicle telematics unit to maintain the data mode and also to enter a voice mode when the sensed amount of time exceeds the predetermined threshold.

According to another embodiment of the invention, there is provided a method of controlling a vehicle telematics unit. The method includes determining that a base station does not use a simultaneous voice and data (SVD) cellular standard; camping on the base station that does not use the SVD cellular standard; establishing a voice mode for the vehicle telematics unit while camped on the base station; detecting a request for data service at the vehicle telematics unit while in the voice mode; switching the voice mode to a data mode that accepts requests for data; determining that the vehicle telematics unit has not had a data request via the data mode for a predetermined amount of time; and reactivating the voice mode and maintaining the data mode while camped on the base station that does not use the SVD cellular standard.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

The method described below involves vehicle telematics units using wire wireless carrier systems that do not support simultaneous voice and data (SVD) wireless communications. Under those circumstances, the vehicle telematics unit can provide a data connection (e.g., for itself or for a third party) via the wireless carrier system but when voice communications to the vehicle telematics unit are attempted (either sent or received) those communications may not be successful. Put differently, the vehicle telematics unit as part of providing the data connection may not be listening for pages from the wireless carrier system that alert the unit of a voice call or voice communications. Such circumstances can exist when the wireless carrier system provides service using a 3G cellular standard or using an LTE standard that does not permit SVD communications (e.g., circuit-switched fallback (CSFB) and voice over LTE (VoLTE) features are not possible).

To permit the reception of voice calls during the data connection despite the non-SVD environment, the vehicle telematics unit can manage a cellular connection in the non-SVD environment by normally establishing a voice mode even if the vehicle is currently accepting data requests, such as may occur when the vehicle telematics unit acts as a Wi-Fi "hotspot." The vehicle telematics unit can use the method/system described herein with non-SVD cellular service when it acts as a Wi-Fi "hotspot" that permits other wireless devices within a limited geographical range of the vehicle access to the Internet. When the vehicle telematics unit detects a need for data over the Wi-Fi link, the vehicle telematics unit can switch to a data mode in the non-SVD environment. After the data mode has remained inactive for a predetermined amount of time, the vehicle telematics unit can switch out of the data mode, or leave the data mode dormant so that it can still receive data requests, and return to the voice mode to monitor if any incoming voice pages are present or have been missed. In this way, the vehicle telematics unit can provide a data connection, such as the one used for the Wi-Fi hotspot, but still remain ready to carry out voice communications that are directed to the vehicle telematics unit. Thus, the vehicle telematics unit can manage itself in the non-SVD environment to provide both data and voice communications.

Figure 1:
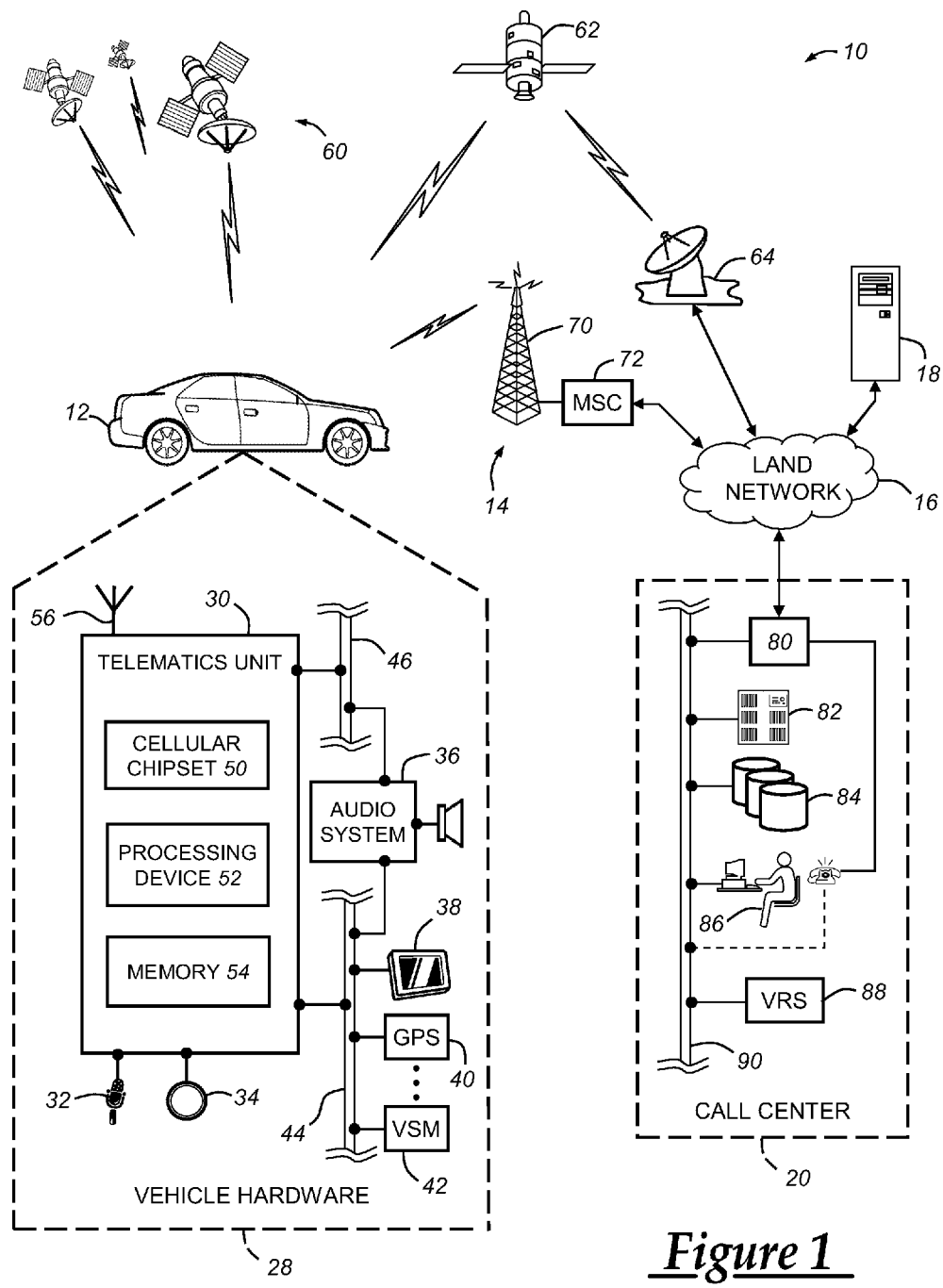
FIG. 1 is a block diagram depicting an embodiment of a communications system that is capable of utilizing the method disclosed herein.

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000, 1×EV, 1×DO) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
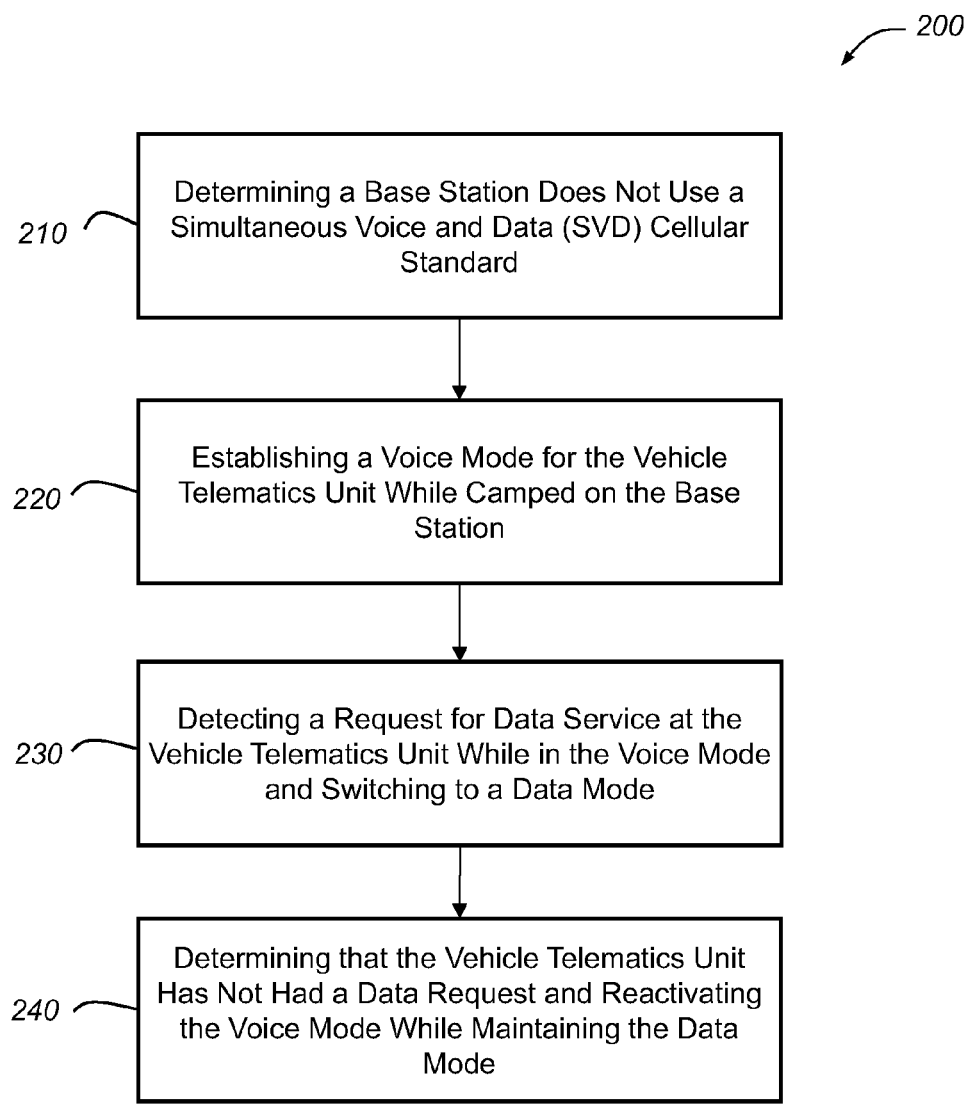
FIG. 2 is a flow chart of an embodiment of a method of controlling a vehicle telematics unit.

Turning now to FIG. 2, there is shown a method 200 of controlling the vehicle telematics unit 30. The method 200 begins at step 210 by determining that a base station, such as cell tower 70, does not use a simultaneous voice and data (SVD) cellular standard. The vehicle telematics unit 30 can camp on the cell tower 70 and as part of the wireless "handshake" or exchange of information that is used to initially register the unit 30 with the tower 70 and/or the wireless carrier system 14, the unit 30 can identify the cellular standard available at the tower 70. For example, the base station 70 can send the vehicle telematics unit 30 a signal indicating that the station 70 provides a 3G cellular standard. The vehicle telematics unit 30 can then determine that the cell tower 70 does not provide a SVD cellular standard because it uses a particular 3G standard (e.g., 1xDO). While 3G is described in this embodiment, it should be appreciated that other cellular standards that do not use a SVD cellular standard are possible. As discussed above, base stations and/or wireless carrier systems 14 that do not use a SVD cellular standard can generally be described as a cellular environment that is without features, such as a circuit-switched fallback (CSFB) or voice over long term evolution (VoLTE). That is, even if a cellular standard is labeled 4G or LTE it is still possible that such a standard may be one that does not use SVD. The method 200 proceeds to step 220.

At step 220, a voice mode is established for the vehicle telematics unit 30 while camped on the cell tower 70. When the vehicle telematics unit 30 is camped on or registered with the cell tower 70 (or wireless carrier system 14), the unit 30 can place itself in the voice mode. Doing so can permit the vehicle telematics unit 30 to receive pages from the cell tower 70 that alert the unit 30 that voice calls and/or other voice communications are directed to the unit 30. The vehicle telematics unit 30 can remain in the voice mode as a default setting while the unit 30 is camped on the base station using the non-SVD cellular standard. The method 200 proceeds to step 230.

At step 230, a request is detected for data service at the vehicle telematics unit 30 while in the voice mode. The voice mode can then be switched to a data mode that accepts requests for data. Given that the cell tower 70 does not provide a SVD cellular standard, the vehicle telematics unit 30 may not provide both voice and data simultaneously and therefore chooses to provide one over the other. Once the request for data service is received, the vehicle telematics unit 30 can place itself into a data mode during which the unit 30 can send and receive data to/from the wireless carrier system 14. In one example of how this can be carried out, the vehicle telematics unit 30 can act as a Wi-Fi "hotspot" that enables other wireless devices within the range of a short-range wireless access network (WAN) to access the Internet through the unit 30 and wireless carrier system 14. The area serviced by the hotspot can be defined by the short-range wireless signal generated by the vehicle telematics unit 30 and used to wirelessly send and receive data between the unit 30 and one or more wireless devices accessing the hotspot. When one of the wireless devices detects the hotspot and begins exchanging data with the vehicle telematics unit 30, the unit 30 can then place itself into the data mode to facilitate the data communications between the wireless device and the cell tower 70/wireless carrier system 14. The method 200 proceeds to step 240.

At step 240, it is determined that the vehicle telematics unit 30 has not had a data request via the data mode for a predetermined amount of time. While the vehicle telematics unit 30 is camped on the base station/cell tower 70 that does not use an SVD cellular standard and in the data mode, the unit 30 may not receive pages from the base station/cell tower 70 that indicate that a voice call is present. Thus, the vehicle telematics unit 30 can use an algorithm stored in the memory 54 and executed by the processor 52 that governs when the unit 30 returns to the voice mode. This can be carried out by sensing an amount of time that has passed since the vehicle telematics unit 30 last received a request for data while in the data mode. For instance, using the Wi-Fi hotspot example above, the vehicle telematics unit 30 may have one or more wireless devices accessing data through the hotspot but the unit 30 has not received data or a request for data from the wireless devices for more than a predetermined amount of time. The vehicle telematics unit 30 can sense an amount of time that has passed since the last data request or data transmission from one of the wireless devices using the hotspot. This sensed amount of time can be compared with a predetermined threshold time value using the vehicle telematics unit 30. If the sensed amount of time is greater than the predetermined threshold time value, then the voice mode is reactivated and the data mode is maintained while camped on the base station that does not use the SVD cellular standard. The data mode can be designated as dormant in a way that the data mode will be maintained so that one of the wireless devices can still place a request for data using the hotspot.

When the vehicle telematics unit 30 then receives a data request from one or more wireless devices at its WiFi hotspot, the unit 30 can switch out of or end the voice mode and return to the data mode for providing data service to the wireless devices via the cell tower 70/wireless carrier system 14. And while in the data mode, other inputs received at the vehicle telematics unit 30 can end the data mode and return the unit 30 to the voice mode. For example, the vehicle telematics unit 30 can receive a request from a vehicle occupant for a voice call. In that case, the vehicle telematics unit 30 can end the data mode and place itself in the voice mode. The method 200 then ends.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of controlling a vehicle telematics unit, comprising the steps of:
   (a) placing the vehicle telematics unit in a data mode while camped on a base station that does not use a simultaneous voice and data (SVD) cellular standard;
   (b) sensing an amount of time that has passed since the vehicle telematics unit last received a request for data while in the data mode;
   (c) comparing the sensed amount of time with a predetermined threshold using the vehicle telematics unit; and
   (d) commanding the vehicle telematics unit to maintain the data mode and also to enter a voice mode when the sensed amount of time exceeds the predetermined threshold.

2. The method of claim 1, wherein the data mode is used along with a Wi-Fi hotspot provided by the vehicle telematics unit.

3. The method of claim 2, further comprising the step of sensing the amount of time that has passed since the vehicle telematics unit last received a request for data via the Wi-Fi hotspot.

4. The method of claim 1, further comprising the step of ending the voice mode when the vehicle telematics unit detects a request for data.

5. The method of claim 1, wherein the base station uses a 4G or a long term evolution (LTE) cellular standard.

6. The method of claim 1, wherein the base station uses a 3G cellular standard.

7. The method of claim 1, wherein the base station is a cell tower.

8. The method of claim 1, wherein the vehicle telematics unit is unable to receive a voice page from the base station while in the data mode.

9. A method of controlling a vehicle telematics unit, comprising the steps of:
   (a) determining that a base station does not use a simultaneous voice and data (SVD) cellular standard;
   (b) camping on the base station that does not use the SVD cellular standard;
   (c) establishing a voice mode for the vehicle telematics unit while camped on the base station;
   (d) detecting a request for data service at the vehicle telematics unit while in the voice mode;
   (e) switching the voice mode to a data mode that accepts requests for data;
   (f) determining that the vehicle telematics unit has not had a data request via the data mode for a predetermined amount of time; and
   (g) in response to the determination of step (f), reactivating the voice mode and maintaining the data mode while camped on the base station that does not use the SVD cellular standard.

10. The method of claim 9, wherein the data mode is used along with a Wi-Fi hotspot provided by the vehicle telematics unit.

11. The method of claim 10, further comprising the step of determining that the vehicle telematics unit has not had a data request via the Wi-Fi hotspot for the predetermined amount of time.

12. The method of claim 9, further comprising the step of ending the voice mode when the vehicle telematics unit detects a request for data.

13. The method of claim 9, wherein the base station uses a 4G or a long term evolution (LTE) cellular standard.

14. The method of claim 9, wherein the base station uses a 3G cellular standard.

15. The method of claim 9, wherein the base station is a cell tower.

16. The method of claim 9, wherein the vehicle telematics unit is unable to receive a voice page from the base station while in the data mode.

* * * * *